[19] United States Patent
McGonigal

[11] 3,957,652
[45] May 18, 1976

[54] POCKET SCREEN ASSEMBLIES FOR CENTRIFUGAL SEPARATORS AND REPLACEMENT THEREFOR

[75] Inventor: Ian McGonigal, Winnipeg, Canada

[73] Assignee: Delta Precision Casting Co. Ltd., Winnipeg, Canada

[22] Filed: May 12, 1975

[21] Appl. No.: 576,336

Related U.S. Application Data

[63] Continuation-in-part of Ser. No. 370,813, June 18, 1973, abandoned.

[30] Foreign Application Priority Data

June 26, 1972 Canada................................ 145627

[52] U.S. Cl. ............................................... 210/498
[51] Int. Cl.² ......................................... B01D 39/10
[58] Field of Search .................. 29/163.5 F; 210/78, 210/232, 330, 360 R, 380, 402, 498, 512

[56] References Cited
UNITED STATES PATENTS

| | | | |
|---|---|---|---|
| 2,015,141 | 9/1935 | Dustan................................ | 210/405 |
| 2,419,155 | 4/1947 | Orton, Jr. ........................ | 210/498 X |
| 2,737,086 | 3/1956 | Dustan................................ | 210/498 |
| 3,401,800 | 9/1958 | Stock.............................. | 210/498 X |

FOREIGN PATENTS OR APPLICATIONS 512,981 10/1939 United Kingdom................. 210/498

Primary Examiner—Charles N. Hart
Assistant Examiner—Richard W. Burks
Attorney, Agent, or Firm—Stanley G. Ade

[57] ABSTRACT

Milled screen units can be tack welded to existing pockets after the conventional screen has been removed or can be recessed into the top of modified pockets and tack welded. In both cases the construction of the screen unit permits minimal tack welding thus obviating the change in metallurgical structure normally present thereby reducing chemical fretting when used with active solutions and/or abrasive particles. The screen is formed from a cylinder in which the slits are milled. The sections are then cut from the cylinder and flattened so that the slits take up a cross sectional configuration having a narrow width on one side and gradually widening towards the other side thus preventing clogging during use.

5 Claims, 11 Drawing Figures

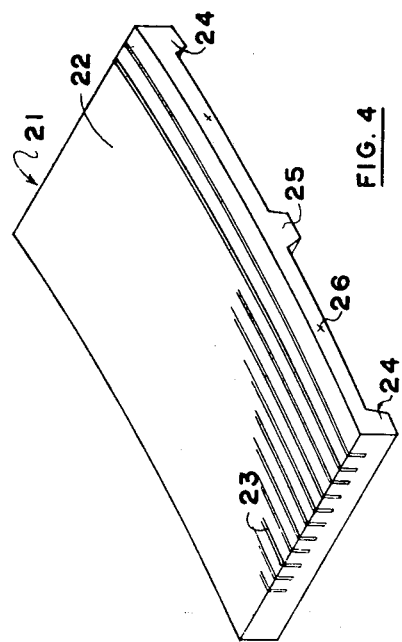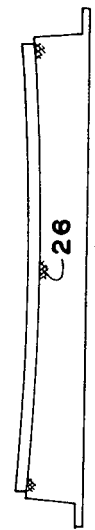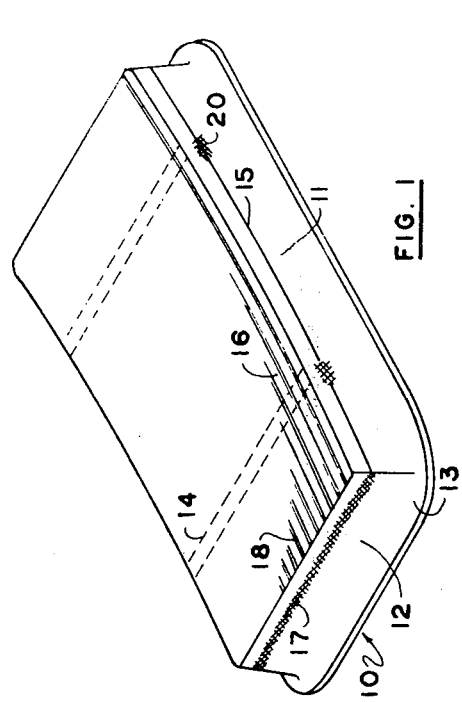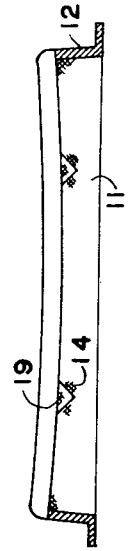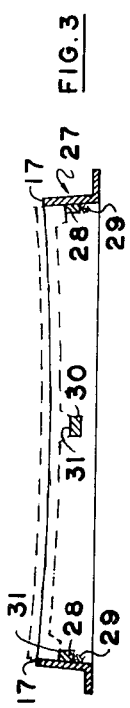

POCKET SCREEN ASSEMBLIES FOR CENTRIFUGAL SEPARATORS AND REPLACEMENT THEREFOR

BACKGROUND OF THE INVENTION

This application constitutes a continuation-in-part of application Ser. No: 370813 filed June 18th, 1973 and now abandoned.

Centrifugal separators which use the pocket type screen assemblies, normally consist of a substantially rectangular pocket component having end and side walls with a plurality of cross bars welded between the side walls with a plurality of cross bars welded between the side walls in spaced and parallel relationship. Individual wires or strips are then placed longitudinally on the upper edges of the pocket and are welded to the ends and to the cross bars thus giving an upper surface which consists of a plurality of wires or strips in spaced and parallel relationship, defining therebetween relatively thin parallel slits. Inasmuch as the majority of such units are manufactured from stainless steel, the assembly and manufacture of said pocket assemblies is extremely time consuming and expensive.

Furthermore, when used in conjunction with centrifugal separators for the separation of relatively active materials from abrasive solids, the excess welding required to assemble such units changes the metallurgical structure thus allowing the material adjacent the weld to be acted upon by the solutions. This together with the abrasive action of the particles rapidly wears away these areas in a process known as "fretting" thus necessitating the relatively expensive replacement at frequent intervals. The expense is not only due to the cost of replacing the entire pocket assemblies but also to the fact that the centrifugal separator is out of use while these are being replaced.

Although the present invention has been designed specifically for use in potash minin, nevertheless it should be assumed that the claims are not so limited.

SUMMARY OF THE INVENTION

The present invention overcomes the disadvantages inherent with conventional pocket screen assemblies in two ways. Firstly, by forming a screen unit from a one-piece section by milling the slots therein, a screen unit can be produced which can be installed upon existing pocket components after the present screen in it has been removed, with the minimum of welding being required to hold the unit in place thus reducing and practically eliminating any metallurgical structure changes.

Secondly, the pocket components can be modified to receive a milled one piece screen unit in partially recessed relationship, once again only requiring small tack welds at the edges to hold same in place. In the latter case, of course, these can be replaced if necessary although such replacement is at far greater intervals than herebefore.

The principal object and essence of the invention is therefore to provide a device of the character herewithin described which includes a pocket component having a onepiece milled screen unit tack welded into position and which is manufactured from a cylinder of material having the slots milled therein. The screen unit is then cut from the cylinder, flattened out and then curved longitudinally to suit the curvature of the drum in which it is to be used.

Another object of the invention is to provide a device of the character herewithin described which enables stainless steel units to be produced relatively economically and in which the milled slots are tapered in cross section when formed as aforesaid, so that clogging is reduced or eliminated.

Another object of the invention is to provide a device of the character herewithin described which, due to the elimination of fretting, gives much longer life when in use with active solutions and abrasive particles.

Still another object of the invention is to provide a device of the character herewithin described in which a one piece milled plate can easily be substituted for the existing individually assembled wire or strip grate units normally used with pocket assemblies.

A still further object of the invention is to provide a device of the character herewithin described which is simple in construction, economical in manufacture, and otherwise well suited for the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF DRAWINGS

FIG. 1 is an isometric view of a conventional pocket screen assembly.

FIG. 2 is a longitudinal section of FIG. 1.

FIG. 3 is a longitudinal section of a modified pocket component.

FIG. 4 is an isometric view of the improved one piece screen unit.

FIG. 5 is a side elevation of an existing pocket component with the unit of FIG. 4 replacing a conventional screen unit.

In the drawings like characters of reference indicate corresponding parts in the different figures.

DETAILED DESCRIPTION

Figure 10:
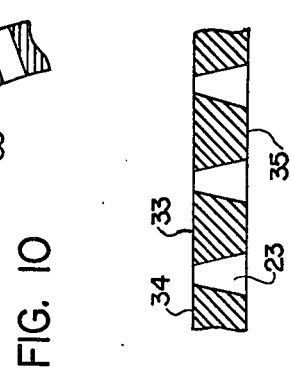
FIG. 10 is an enlarged fragmentary cross sectional view of part of the cylindrical wall with the slits milled therethrough.

FIGS. 1 and 2 show a conventional pocket screen assembly collectively designated 10 which is usually manufactured from stainless steel and consists of a pair of spaced and parallel side walls 11 and a pair of spaced and parallel end walls 12. A perimetrical flange 13 extends outwardly from the base edges of the side walls and end walls in the conventional manner.

A pair of transversely situated struts or strips 14 span the side walls 11 below the upper edges 15 thereof and these struts are welded by the ends thereof to the inner surfaces of the side walls 11.

A plurality of longitudinally extending individual wires or strips 16 are then welded by the ends thereof to the upper edges 17 of the end walls in spaced and parallel relationship thus defining relatively fine slits 18 therebetween. The entire edge 17 is therefore welded, together with the welds 19 attaching the underside of the strips or wires 16 to the cross struts 14 and these struts are in turn, of course, welded to the side walls 11 as hereinbefore described and further welds 20 attach the outermost strips 16 to the side walls adjacent these cross bars.

It will therefore be appreciated that considerable welding is required in order to assemble the complete pocket screen assembly and this welding affects the metallurgical characteristics of the material in the area of the weld thus permitting the active fluids to react with the metal and allowing the abrasive particles to abrade or fret these areas as hereinbefore mentioned.

Dealing first with the improvement shown in FIGS. 4 and 5, reference to FIG. 4 will show the improved screen unit collectively designated 21 which is machined and milled from a cylinder of stainless steel and then opened as will hereinafter be described, to form the arcuately curved substantially rectangular plate 22 shown in FIG. 4. This plate is provided with a plurality of spaced and parallel milled slits 23 extending through the thickness of the plate thus acting as the filter slits for the separating action.

Transversely extending abutments 24 are formed integrally upon the underside of the plate adjacent the ends thereof and a centrally located transverse abutment 25 is also formed integrally with the plate, said centrally located abutment being in spaced and parallel relationship with the abutments 24 as clearly shown.

When it is desired to utilize the improved screen unit 21 upon an existing pocket assembly 10, the worn screen unit on the pocket assembly is removed and the upper edges 15 and 17 cleaned up whereupon the new screen unit 21 is placed on these upper edges with the abutments 24 engaging the edges 17 of the end walls 12 and the end of the abutment 25 engaging the upper edges 15 of the side walls 11. Small tack welds 26 hold the screen unit in place without upsetting the metallurgical characteristics of the areas surrounding same. This enables a replacement screen unit to be used with existing pocket assemblies.

However, the preferred embodiment is shown in FIG. 3 in which the pocket component 27 is modified by providing transverse bars 28 welded to the end walls 12 on the inner surface thereof as indicated by reference character 29 and spaced downwardly from the upper edges 17 of these end walls. A centrally located bar 30 spans the side walls 11 intermediate the ends thereof and in spaced and parallel relationship with the bars 28 said bar 30 being in the same plane as the bars 28 as clearly shown.

The screen unit 21 is then seated within the upper edges of the pocket and recessed so that the abutments 24 and 25 engage the bars 28 and 30 respectively as shown in phantom in FIG. 3. Small tack welds may be applied as indicated by reference character 31 once again holding the screen unit in position without affecting the metallurgical characteristics of the surrounding areas.

If at any time these require replacement, such replacement is relatively easy and simple to accomplish. However, as the majority of fretting is avoided by this construction, replacement times are extended considerably.

As mentioned previously, the screen units 21 are formed from a hollow cylinder of stainless steel or the like 31 and illustrated in FIGS. 6 through 11. The interior of the hollow cylinder 31 is machined out to form the abutments 24 and 25, the abutments 24 being at each end of the cylinder and the abutment 25 being intermediate the ends thereof.

The slits 23 are then milled through the wall of the hollow cylinder 31 in spaced and parallel relationship and extending from one end to the other. It will be observed from the drawings that these slits 23 are formed clear through the wall of the cylinder, but terminate spaced from the inner surface 32 of the abutments 24 and 25.

Figure 9:
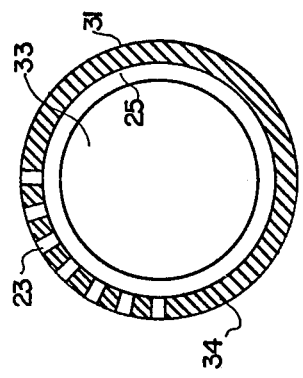
FIG. 9 is a cross sectional view substantially along the line 9—9 of FIG. 8.
Figure 6:
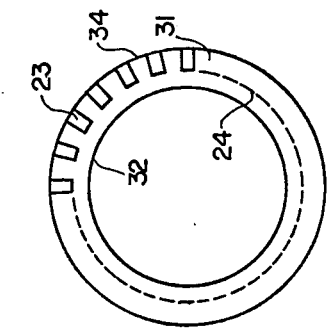
FIG. 6 is an end view of the cylinder from which the screen units are formed.
Figure 8:
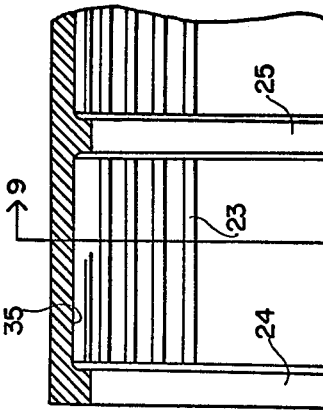
FIG. 8 is a fragmentary longitudinal cross sectional elevation of FIG. 7.

Once the slits have been milled, the cylinder is sectioned or segmented as, for example, for a quadrant or the like and is cut from the cylinder, said guadrant being identified by reference character 33 in FIG. 9. However, it will be appreciated that the segment is cut to suit the finished dimensions of the screen unit 21 formed from the segment.

Figure 11:
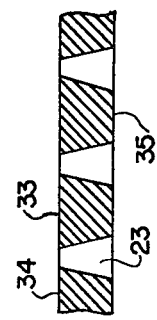
FIG. 11 is a view similar to FIG. 10, but showing the cylindrical wall portion opened up or flattened out to form the tapered cross sectioned slits.
Figure 7:
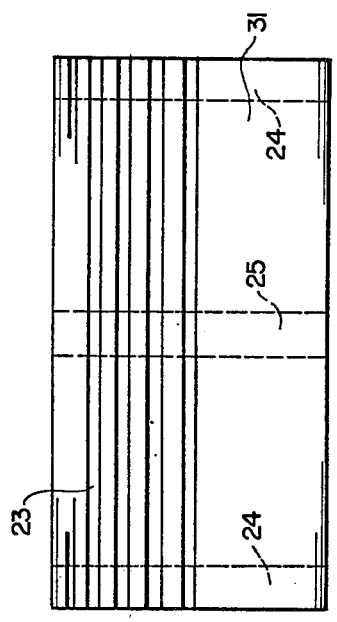
FIG. 7 is a side elevation of FIG. 6.

This segment 33 is then opened up or flattened out as illustrated in FIG. 11 whereupon it is curved longitudinally to suit the curvature of the centrifugal separator drum upon which it is to be used and this longitudinal curvature is clearly shown in FIG. 4.

One of the important objects of forming the screen unit in this way is the fact that the slits 23 are of equal width from the surface 34 to the surface 35, prior to opening up the segment 33. However, when the segment 33 is flattened as illustrated in FIG. 11, the cross sectional configuration of these slits 23 is as shown in FIG. 11 inasmuch as the cross sectional dimension at the surface 34 is much narrower than the cross sectional dimension at the surface 35. In other words, the cross sectional dimension of the slits 23 increases from surface 34 towards surface 35. This prevents clogging of the slits in operation as no jamming or wedging can take place with the exception of the entrance to the slits on surface 34 and here, any particles which may jam temporarily at the entrance, are readily cleared by the agitation and pressure of the solution within the drum which acts directly on this particular surface when installed.

In the prior art, many attempts have been made to prevent this clogging from occurring, but all methods of manufacture and construction include slits which are defined with parallel sides so that particles can jam within these parallel sides and prevent the filter from working efficiently.

Although FIG. 9 refers to a segment being cut from the cylinder, nevertheless it will be appreciated that the screen unit can be formed by making one longitudinal cut through the wall of the cylinder 31 and then opening up or flattening the entire cylinder from which sections can be cut to form the screen unit.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense. What I claim as my invention is:

1. A pocket screen assembly for centrifugal separators and the like comprising in combination a screen holding pocket component having a pair of spaced and parallel side walls, a pair of spaced and parallel end walls and a perimetrical flange extending outwardly from the lower edges of said walls, a plurality of screen unit supports spanning said walls internally, a screen unit detachably engageable within the open top of said pocket component and supported by said screen unit supports, and means to hold said unit in said detachable relationship partially recessed within said open top of said pocket component, said screen unit comprising a one piece arcuately curved plate substantially rectangular when viewed in plan and having an inner surface and an outer surface and a plurality of spaced and parallel slits milled through said plate, the cross sectional dimension of said slits increasing from said inner surface to said outer surface, said plate having a plurality of transverse abutments formed on the outer surface thereof engageable upon said screen unit supports.

2. The assembly according to claim 1 in which said supports include a bar secured to each end wall and extending therealong and a central bar secured to each side wall and extending therebetween parallel to said first mentioned bar.

3. The assembly according to claim 1 in which said abutments include one at each end thereof and one extending across said plate intermediate said end abutments and in spaced and parallel relationship therewith.

4. In a pocket screen assembly for centrifugal separators and the like which includes a screen holding pocket component having a pair of spaced and parallel side walls, a pair of spaced and parallel end walls and a perimetrical flange extending outwardly from the lower edges of said walls; a screen unit for said assembly, said screen unit comprising a one piece arcuately curved plate substantially rectangular when viewed in plan and a plurality of spaced and parallel slits milled through the surface of said plate, the cross sectional dimension of said slits increasing from one side to the other side of said unit, said plate having a plurality of transverse abutments formed on the underside thereof engageable upon the associated screen unit.

5. The screen unit according to claim 4 which includes an abutment formed transversely at each end of said plate and upon the underside thereof and a further abutment formed transversely upon the underside of said plate intermediate said first mentioned abutments and parallel thereto.

* * * * *